United States Patent Office 3,801,668
Patented Apr. 2, 1974

---

3,801,668
PROCESS FOR THE PRODUCTION OF SQUALENE-TYPE HYDROCARBONS
Akira Komatsu, Susumu Akutagawa, and Taichi Someya, Tokyo, Japan, assignors to Takasago Perfumery Co., Ltd., Tokyo, Japan
No Drawing. Filed May 23, 1973, Ser. No. 362,986
Int. Cl. C07c *11/00, 11/14*
U.S. Cl. 260—677 R
22 Claims

ABSTRACT OF THE DISCLOSURE

Production of squalene-type hydrocarbons by dimerizing conjugated diene compounds in the presence of a catalyst system consisting of a palladium compound, a ligand of the formula $MR'_3$ (where M represents P or As, and R' represents a saturated or unsaturated aliphatic or aromatic hydrocarbon group) and a strong alkaline agent, in an alcohol in the presence of a compound having ether bond(s).

A squalene-type hydrocarbon of the formula

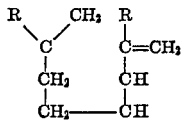

where R is —$(CH_2)_2CH=C(CH_3)_2$ or

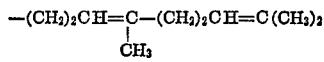

BACKGROUND OF THE INVENTION

(1) Field of the invention

This invention relates to a process for preparing squalene-type hydrocarbons particularly represented by Formula I

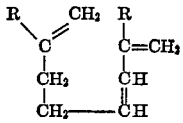
(I)

wherein R represents a saturated or unsaturated hydrocarbon group, and to novel squalene-type hydrocarbons within Formula I.

(2) Description of the prior art

Various studies have hitherto been performed on the oligomerization of conjugated diene compounds using a palladium complex, and a number of patents have been granted relating to such subject matter.

However, no successful process for selectively dimerizing a butadiene substitute having the general formula

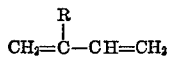

e.g., isoprene, myrcene, farnesene, etc. to form a squalene-type hydrocarbon is known.

Angen. Chem., 78, 157 (1966), by G. Wilke relates to the synthesis of dodecatetraene (1, 3, 6, 10) by dimerizing butadiene in the presence of bis-π-allyl-palladium catalyst, and J. Chem. Soc. Japan 88, 1306 (1967), by S. Takahashi relates to the synthesis of octatriene (1, 3, 7) by dimerizing butadiene in the presence of bis-triphenyl phosphine-maleic anhydride-palladium catalyst.

SUMMARY OF THE INVENTION

It is a primary object of the present invention to provide a novel process for manufacturing simply and advantageously squalene-type hydrocarbons of Formula I.

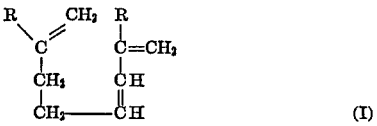
(I)

wherein R represents a saturated or unsaturated hydrocarbon group. These squalene-type hydrocarbons can be used as raw materials for various medical supplies, industrial chemicals, cosmetics, etc.

Above all, a dimerized product prepared from farnesene (wherein the substituent R in the above Formula I is

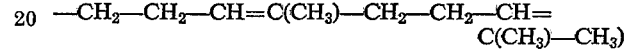

has the skeleton of natural squalene and is useful as a raw material for cosmetics, machine oils, etc. For example, a final squalene-type hydrocarbon obtained by dimerizing farnesene can be hydrogenated in the presence of a Raney-Ni catalyst at a 50 kg./cm.$^2$ hydrogen pressure at 150° C. for 3 hours to give squalene having the same nature as natural squalene.

The thus obtained squalene is a raw material for various cosmetics and also can be used as a low temperature machine oil.

The inventors have found that when conjugated diene compounds are dimerized in the presence of a compound having ether bond(s) using a catalyst system comprising a palladium complex with a strong alkaline agent in an alcohol, the conjugated diene compounds are selectively bound at their 4-position carbon atoms.

The present invention also provides novel squalene-type hydrocarbons of the formula

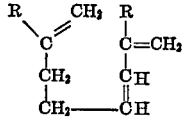

where R is

or

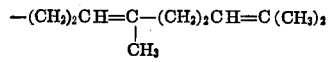

DETAILED DESCRIPTION OF THE INVENTION

More precisely, the present invention relates to squalene-type hydrocarbons of the above Formula I as well as a novel process for the manufacture thereof which is characterized by reacting conjugated diene compounds of Formula II

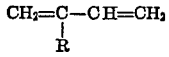
(II)

wherein R has the same meaning as mentioned above, using a catalyst system consisting of a palladium compound, a ligand of the formula $MR'_3$ (where M represents P or As, and R' represents a saturated or unsaturated aliphatic or aromatic hydrocarbon group) and a strong alkaline agent, in an alcohol in the presence of a compound having ether bond(s).

The palladium compound(s) used in the present invention as a catalyst primarily include a palladium salt of the formula $PdX_2$ (where X represents a halogen or $NO_3$ or CN or $-OCOCH_3$), and secondarily include a palladium-$\pi$-allyl complex of the formula

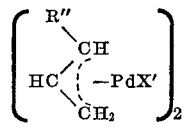

(where R" represents a hydrogen atom or $-CH_2X'$, and X' represents a halogen).

These palladium compounds provide a sufficient effect in an amount of 5 mmol or less thereof per 1 mol of conjugated diene compound, and are most preferably used in an amount equal to or greater than 1 mmol per 1 mol of conjugated diene compound.

As the ligand there is used a compound of the formula $MR'_3$ (where M and R' have the same meanings as mentioned above), which includes, for example, tri-butyl phosphine, tri-phenyl phosphine, tri-butyl arsenic, etc. It is preferred to use these compounds in an amount of 0.5–4 mols, preferably 1–2 mols, per 1 mol of the palladium compound.

In the present invention, the palladium compound and ligand may be used individually or, alternatively, a complex of the formula $(R'_3M)_2PdX_2$ (where R', M and X have the same meanings as given above) can be used in place of the palladium compound and ligand, whereby good effects are also attained. When the complex is used, it is generally used in an amount of 1–5 mmols per 1 mol of conjugated diene compounds.

As the strong alkaline agents there can be used an alkali metal hydroxide such as sodium hydroxide, potassium hydroxide, etc., as well as an alkaline metal alcoholate, e.g., $C_2H_5ONa$ sodium ethoxide, $(CH_3)_3COK$ potassium tertiary butoxide, and the like. It is preferred to use these agents in an amount of 1–4 mols, especially 2–4 mols, per 1 mol of the palladium compound.

As the alcohols used in the present invention there can be mentioned, for example, saturated or unsaturated aliphatic alcohols including any primary or secondary alcohols. The alcohols can include compounds having ether bond(s) in the hydrocarbon chain. When alcohols including ether bond(s) therein are used in the process of the present invention, the use of the compounds having ether bond(s) which will be mentioned hereunder can be omitted. Examples of suitable alcohols having ether bonds are $C_2H_5OCH_2CH_2OH$, ethyl Cellosolve;

$$CH_3O(CH_2)_2O(CH_2)_2OH$$

diethylene glycol monomethylether;

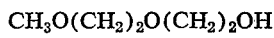

tetrahydrofurfuryl alcohol; and the like.

The amount of alcohol(s) used is not limited, but is, as a rule, preferably 20–40% by volume on the basis of the conjugated diene compounds. When an alcohol having ether bonds is used, and the use of a compound having ether bonds can, if desired, be omitted, the alcohol having ether bonds is preferably used in an amount of 20–40% by volume.

The compounds having at least one ether bond(s) (there is no theoretical limit on the maximum number of bonds) include, for example, a dialkyl-ether, ethylene-glycol-dimethyl-ether, tetrahydrofuran, dioxane, anisole, etc. These compounds have the function, together with the above mentioned ligand, to provide a selectivity of reaction for the 4-4 bond of the conjugated diene compound. The compounds having ether bond(s) is/are generally used in an amount of 5–100%, preferably 10–20%, by weight of the conjugated diene compound(s).

It is preferable to perform the present invention in an inert gas atmosphere, e.g., argon, the reaction temperature is preferably 0–120° C., particularly 50–80° C., and the reaction period is preferably 5–40 hours, particularly 8–10 hours. The pressure of reaction will usually be 2–20 kg./cm.$^2$ G, preferably 7–9 kg./cm.$^2$ G.

As explained in detail in the above, the present invention is particularly excellent in that squalene-type-hydrocarbons may advantageously be prepared by selectively combining conjugated diene compounds at their 4-4 position carbons by means of a simple operation.

The present invention will be illustrated in more detail by the following examples, where the pressure of reaction was 7–9 kg./cm.$^2$.

EXAMPLE 1

Into a pressure bottle having a volume of 100 ml. were put 0.35 g. of palladium chloride (2 mmol), 0.52 g. of triphenyl phosphine (2 mmol) and 0.58 g. of sodium phenoxide (5 mmol), and the atmosphere therein was replaced by nitrogen gas. 60 ml. of isoprene, 10 ml. of isopropyl alcohol and 10 ml. of isopropyl ether were put thereinto, and the bottle sealed. The contents were shaken for 10 hours at 50° C. After reaction, the reaction solution was subjected to fractional distillation, whereby 21 g. of a fraction having a boiling point of 85–90° C./40 mm. Hg and 2 g. of a distillation residue were obtained and 18 g. of unreacted isoprene were recovered.

It was confirmed through gas chromatography (Apiezone L, 45 m. x 0.25 mm. $\phi$, 70° C.) that the purity of the resulting product was 98%, and from NMR and IR data and the carbon skeleton of the corresponding hydrogenated product (B.P. 75–80° C./40 mm. Hg) that the product has the structure of above Formula I wherein $R=CH_3$.

Elemental analyses: $C_{10}H_{16}$.—Calculated (percent): C, 88.2; H, 11.8. Measured (percent): C, 87.5; H, 12.5.

While the catalysts in the examples are formed in situ they need not be, and can be formed in advance of use.

EXAMPLE 2

60 ml. of isoprene, 10 ml. of n-butyl alcohol, 10 ml. of diethylether, 0.37 g. of bis-$\pi$-allyl palladium chloride (2 mmol), 0.43 g. of tributyl-arsenic (2 mmol) and 0.58 g. of sodium phenolate (5 mmol) were treated following the procedure of Example 1, whereby 35 g. of the compound of Formula I where $R=CH_3$ were obtained (purity: 95%) and 5 g. of isoprene were recovered.

EXAMPLE 3

60 ml. of isoprene, 10 ml. of triethylene glycol-monomethyl ether, 0.46 g. of palladium nitrate (2 mmol), 0.4 g. of tributyl phosphine (2 mmol) and 0.28 g. of potassium hydroxide (5 mmol) were treated following the procedure of Example 1, whereby 33 g. of the compound of Formula I where $R=CH_3$ were obtained (purity: 95%) and 6 g. of unreacted isoprene were recovered.

EXAMPLE 4

60 ml. of myrcene, 7 ml. of isopropanol, 7 ml. of isopropyl ether, 0.46 g. of palladium nitrate (2 mmol), 0.52 g. of triphenyl phosphine (2 mmol) and 0.58 g. of sodium phenolate (5 mmol) were treated following the procedure of Example 1, whereby 20 g. of fraction (1) having a boiling point of 93° C./70 mm. Hg and 30 g. of fraction (2) having a boiling point of 120–130° C./0.3 mm. Hg were obtained.

It was confirmed through gas chromatography (Silicon DC 4000, 4 m. x 3 mm. $\phi$ 200° C.) that the purity of fraction (2) was 95%, and from NMR and IR data and the carbon skeleton of the corresponding hydrogenated product (which was found to correspond to a conventional product through mass spectrography and gas chromatography—Apiezone L, 45 m. x 0.25 mm φ, 150° C.) that the product has the structure of Formula I wherein R=CH₂—CH₂—CH=C(CH₃)₂. Fraction (1) was unreacted myrcene.

Elemental analyses: C₂₀H₃₂.—Calculated (percent): C, 88.2; H, 11.8. Measured (percent): C, 88.6; H, 11.4.

EXAMPLE 5

60 ml. of farnesene, 7 ml. of isopropyl alcohol, 7 ml. of isopropyl ether, 0.46 g. of palladium nitrate (2 mmol), 0.52 g. of triphenyl phosphine (2 mmol) and 0.58 g. of sodium phenolate (5 mmol) were treated following the procedure of Example 1, whereby 10 g. of fraction (1) having a boiling point of 105–120° C./10 mm. Hg and 25 g. of fraction (2) having a boiling point of 175–180° C./0.2 mm. Hg were obtained. Fraction (1) is unreacted, recovered farnesene.

It was confirmed through gas chromatography (silicon DC 4000, 4 m. x 3 mm. φ, 230° C.) that the purity of fraction (2) was 97% and from NMR, IR and mass spectrographic data and from the carbon skeleton of the corresponding hydrogenated product (which has a boiling point of 177–180° C./0.2 mm. Hg and which was found to correspond to the conventional product squalene through mass spectrography and gas chromatography—Apiezone L, 45 m. x 0.25 mm. φ, 175° C.) that the structure of the product therein corresponds to Formula I where

R=CH₂—CH₂—CH=C(CH₃)—CH₂—
　　　　　　　　　　　　CH₂—CH=C(CH₃)—CH₃

Elemental analyses: C₃₀H₄₈.—
　Calculated (percent): C, 88.2; H, 11.8.
　Measured (percent): C, 88.5; H, 11.5.

While the invention has been described in detail and with reference to specific embodiments thereof, it will be apparent to one skilled in the art that various changes and modifications can be made therein without departing from the spirit and scope thereof.

What is claimed is:

1. A process for the preparation of squalene-type hydrocarbons of Formula I

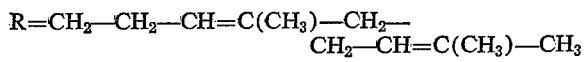

(I)

wherein R represents a saturated or unsaturated hydrocarbon group, characterized in that conjugated diene compounds of Formula II

CH₂=C—CH=CH₂
　　|
　　R
　　　　　　　　　　　　　　　　　　　　(II)

wherein R has the same meaning as mentioned above, are dimerized together using a catalyst system consisting essentially of a palladium compound, a ligand of the formula MR′₃ (where M represents P or As, and R′ represents a saturated or unsaturated aliphatic or aromatic hydrocarbon group) and a strong alkaline agent in an alcohol in the presence of a compound having ether bond(s).

2. A process according to claim 1 in which a palladium salt of the formula PdX₂ (where X represents a halogen, NO₃, CN or —OCOCH₃) or a palladium-π-allyl complex

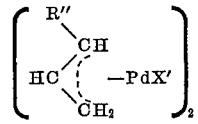

of the formula (where R″ represents a hydrogen atom or —CH₂X′, and X′ represents a halogen), is used as the palladium compound.

3. A process according to claim 1 in which 5 mmol or less of palladium compound per 1 mol of conjugated diene compound is used.

4. A process according to claim 3 where the amount of palladium compound is at least 1 mmol per mol of conjugated diene compound.

5. A process according to claim 1 in which tributyl phosphine, triphenyl phosphine or tributyl arsenic is used as the ligand.

6. A process according to claim 1 in which 0.5–4 mols of ligand per 1 mol of palladium compound are used.

7. A process according to claim 6 where 1–2 mols of ligand per 1 mol of palladium compound are used.

8. A process according to claim 1 in which a complex of the formula (R′₃M)₂PdX₂ is used as the catalyst where M represents P or As, and R′ represents a saturated or unsaturated aliphatic or aromatic hydrocarbon group and X represents a halogen, NO₃, CN or —OCOCH₃.

9. A process according to claim 1 in which an alkali metal hydroxide, or an alkali metal alcoholate is used as the strong alkaline agent.

10. A process according to claim 9 where the alkali metal hydroxide is sodium or potassium hydroxide.

11. A process according to claim 1 in which 1–4 mols of alkaline agent per 1 mol of palladium compound are used.

12. A process according to claim 11 where 2–4 mols of alkaline agent per 1 mol of palladium compound are used.

13. A process according to claim 1 in which a saturated or unsaturated, primary or secondary aliphatic alcohol is used as the alcohol solvent.

14. A process according to claim 1 in which 20–40% by volume on the basis of conjugated diene compound of alcohol is used.

15. A process according to claim 14 where the alcohol contains one or more ether bonds in the hydrocarbon chain thereof.

16. A process according to claim 1 in which a di-alkyl ether, ethyleneglycol-dimethylether, tetrahydrofuran, dioxane or anisol is used as the compound having ether bond(s).

17. A process according to claim 1 in which the dimerization reaction is performed in an inert gas atmosphere, under a reaction temperature of 0–120° C. for a reaction period of 5–40 hours.

18. A process according to claim 17 where the pressure of reaction is 1–20 kg./cm.².

19. A process according to claim 17 where the reaction temperature is 50–80° C. and the reaction time is 8–10 hours.

20. A process according to claim 1 wherein R of Formula I is CH₃.

21. A process according to claim 1 wherein R of Formula I is CH₂—CH₂—CH=C(CH₃)₂.

22. A process according to claim 1 wherein R of Formula I is

CH₂—CH₂—CH=C(CH₃)—CH₂—
　　　　　　　　　　　　CH₂—CH=C(CH₃)—CH₃

References Cited

UNITED STATES PATENTS

| | | | |
|---|---|---|---|
| 3,444,258 | 5/1969 | Kohnle et al. | 260—677 |
| 3,522,321 | 7/1970 | De Young | 260—666 |
| 3,541,177 | 11/1970 | Hagihara | 260—677 |
| 3,732,328 | 5/1973 | Wright | 260—680 B |
| 3,277,099 | 10/1966 | Seibt et al. | 260—677 |

DELBERT E. GANTZ, Primary Examiner

J. M. NELSON, Asistant Examiner

U.S. Cl. X.R.

260—666B, 680 B, 683.15